US006915215B2

(12) United States Patent
M'Closkey et al.

(10) Patent No.: US 6,915,215 B2
(45) Date of Patent: Jul. 5, 2005

(54) INTEGRATED LOW POWER DIGITAL GYRO CONTROL ELECTRONICS

(75) Inventors: Robert M'Closkey, Los Angeles, CA (US); A. Dorian Challoner, Manhattan Beach, CA (US); Eugene Grayver, Los Angeles, CA (US); Ken J. Hayworth, Pasadena, CA (US)

(73) Assignees: The Boeing Company, Chicago, IL (US); California Institute of Technology, Pasadena, CA (US); The Regents of the University of California, Oakland, CA (US)

( * ) Notice: Subject to any disclaimer, the term of this patent is extended or adjusted under 35 U.S.C. 154(b) by 77 days.

(21) Appl. No.: 10/603,557

(22) Filed: Jun. 25, 2003

(65) Prior Publication Data

US 2004/0088127 A1 May 6, 2004

Related U.S. Application Data

(60) Provisional application No. 60/391,350, filed on Jun. 25, 2002.

(51) Int. Cl.$^7$ ............................................... G06F 11/00
(52) U.S. Cl. ..................................... 702/32; 73/504.12
(58) Field of Search ......................... 702/32, 145, 147; 73/504.12, 504.14, 504.16

(56) References Cited

U.S. PATENT DOCUMENTS

| 392,650 A | 11/1888 | Watrous |
| 4,884,446 A | * 12/1989 | Ljung ...................... 73/504.12 |
| 5,203,208 A | 4/1993 | Bernstein |

(Continued)

FOREIGN PATENT DOCUMENTS

| DE | 44 42 033 A1 | 5/1996 |
| WO | WO 96/38710 | 12/1996 |
| WO | WO 98/15799 | 4/1998 |

OTHER PUBLICATIONS

N. Barbour et al., "Micromechanical Silicon Instrument and Systems Development at Draper Laboratory," AIAA Guidance Navigation and Control Conference, American Institute of Aeronautics and Astronautics, San Diego, CA, Jul. 29–31, 1996, Paper No. 96–3709, pp. 1–7.

T. Fujita et al., "Disk–shaped bulk micromachined gyroscope with vacuum sealing," *Sensors and Actuators A: Physical*, vol. 82, Issues 1–3, May 15, 2000, pp. 198–204.

Grayver, E., et al., "Automatic Gain Control ASIC for MEMS Gyro Applications." Proceedings of the American Control Conference, vol. 2, pp. 1219–1222, Jun. 2001.

(Continued)

*Primary Examiner*—Marc S. Hoff
*Assistant Examiner*—Edward Raymond
(74) *Attorney, Agent, or Firm*—Origin Law; Bradley K. Lortz

(57) ABSTRACT

Embodiments of the invention generally encompass a digital, application specific integrated circuit (ASIC) has been designed to perform excitation of a selected mode within a vibratory rate gyroscope, damping, or "force-rebalance," of other modes within the sensor, and signal demodulation of the in-phase and quadrature components of the signal containing the angular rate information. The ASIC filters dedicated to each channel may be individually programmed to accommodate different rate sensor designs/technology or variations within the same class of sensors. The ASIC architecture employs a low-power design, making the ASIC, particularly suitable for use in power-sensitive applications.

30 Claims, 16 Drawing Sheets

U.S. PATENT DOCUMENTS

| | | | |
|---|---|---|---|
| 5,226,321 A | | 7/1993 | Varnham et al. |
| 5,646,346 A | | 7/1997 | Okada |
| 5,665,915 A | | 9/1997 | Kobayashi et al. |
| 5,783,749 A | | 7/1998 | Lee et al. |
| 5,894,090 A | | 4/1999 | Tang et al. |
| 5,905,202 A | | 5/1999 | Kubena et al. |
| 5,920,012 A | | 7/1999 | Pinson |
| 5,987,986 A | * | 11/1999 | Wyse et al. ............... 73/504.12 |
| 6,009,751 A | | 1/2000 | Ljung |
| 6,044,705 A | | 4/2000 | Neukermans et al. |
| 6,164,134 A | | 12/2000 | Cargille |
| 6,282,958 B1 | | 9/2001 | Fell et al. |
| 6,289,733 B1 | | 9/2001 | Challoner et al. |
| 6,360,601 B1 | * | 3/2002 | Challoner et al. ....... 73/504.12 |
| 6,367,786 B1 | | 4/2002 | Gutierrez et al. |
| 6,467,346 B1 | * | 10/2002 | Challoner et al. ....... 73/504.02 |
| 6,515,278 B2 | | 2/2003 | Wine et al. |
| 6,629,460 B2 | | 10/2003 | Challoner |
| 2003/0033850 A1 | * | 2/2003 | Challoner et al. ............ 73/1.77 |
| 2003/0084722 A1 | * | 5/2003 | Kim et al. ............... 73/504.08 |
| 2003/0150267 A1 | | 8/2003 | Challoner et al. |

OTHER PUBLICATIONS

J.D. Johnson et al., "Surface Micromachined Angular Rate Sensor," A1995 SAE Conference, Paper No. 950538, pp. 77–83.

M'Closkey, R.T., et al., "Analysis of a Microsensor Automatic Gain Control Loop", Proceedings of the American Control Conference, San Diego, California, vol. 5, pp. 3307–3311, 1999.

M'Closkey, R.T., et al., "Mode Localization Induced by a Nonlinear Control Loop", Nonlinear Dynamics, vol. 25, No. 1, pp. 221–236, 2001.

M'Closkey, R.T., et al., "System Identification of a MEMS Gyroscope", J. of Dynamic Systems, Measurement, and Control, vol. 123, pp. 201, Jun. 2001.

M.W. Putty et al., "A Micromachined Vibrating Ring Gyroscope," Solid State Sensor and Actuator Workshop, Transducer Research Foundation, Hilton Head, 1994, pp. 213–220.

Tang, T.K., et al., "Silicon Bulk Micromachined Vibratory Gyroscope", Solid State Sensor and Actuator Workshop, Hilton Head South Carolina, pp. 288–293, 1996.

Tang, T.K., et al., "Silicon bulk micromachined vibratory gyroscope for microspacecraft", Proceedings of the SPIE—The International Society for Optical Engineering, Denver Colorado, vol. 2810, pp. 101–115, 1996.

Tang, T.K., et al., "A Packaged Silicon MEMS Vibratory Gyroscope for Microspacecraft" Proceedings IEEE, The Tenth Annual International Workshop on Micro Electro Mechanical Systems, Nagoya, Japan, pp. 500–505, 1997.

D. Wright et al., "The HRG Applied to a Satelite Attitude Reference System," Guidance and Control, American Astronautical Society, Advances in Astronautical Sciences, 1994, 86:1–13.

* cited by examiner

| Parameter | Symbol | Conditions | min | typ | max | Units |
|---|---|---|---|---|---|---|
| Power Supply IO | PVDD | | 1.25 | | 2.5 | V |
| Power Supply CORE | CVDD | CVDD ≤ PVDD | 1.25 | | 2.5 | V |
| Power Dissipation IO | $P_{IO}$ | VDD=2.5V | | 0.13 | | µW/tap/kHz |
| Power Dissipation CORE | $P_{CORE}$ | | | 0.18 | | |
| Input High Voltage | $V_{IH}$ | | | PVDD | | V |
| Input Low Voltage | $V_{IL}$ | | | 0 | | V |
| Master Clock Frequency | $F_{CLK}$ | VDD=2.5V | 0 | | 37 | MHz |
| Interface Clock Frequency | $F_{CLK\_INT}$ | | | ≤$F_{CLK}$/2 | | MHz |
| Supply at $F_{CLK}$=20MHz | VDD | | 1.6 | | | V |

FIG. 3B

INTEGRATED LOW POWER DIGITAL GYRO CONTROL ELECTRONICS

CROSS-REFERENCE TO RELATED APPLICATIONS

This application claims the benefit under 35 U.S.C. §119 (e) of the following U.S. patent application, which is incorporated by reference herein:

U.S. Provisional Application Ser. No. 60/391,350, filed Jun. 25, 2002, by Robert M'Closkey et al., entitled "INTEGRATED LOW POWER DIGITAL GYRO CONTROL ELECTRONICS".

STATEMENT OF GOVERNMENT RIGHTS

The invention described herein was made in the performance of work under a NASA contract and is subject to the provisions of Public Law 96-517 (35 U.S.C 202) in which the Contractor has elected to retain title.

BACKGROUND OF THE INVENTION

1. Field of the Invention

The present invention relates to devices and methods of controlling and signal processing for vibratory gyroscopes.

2. Description of the Related Art

Vibratory rate gyroscopes exploit a coriolis term in the equations of motion to link two modes of the sensor's elastic structure. One mode is driven to a constant-amplitude harmonic response (requiring a control loop) and consequently any angular motion about the sensor's sensitive axis causes the other mode to respond to this rotation. The amplitude of this response is related to the angular rotation rate. A second feedback loop, as described by Challoner, et. al U.S. Pat. No. 6,360,601 can be used to regulate the response of the second mode to zero and in this case the feedback signal contains information on the angular rotation rate that may be calculated by demodulating this signal with the driven mode's response. Implementation of the feedback control and signal processing electronics for vibratory gyroscopes has previously required custom architectures and solutions.

The feedback control and signal processing elements are present in existing vibratory gyros in the form of a discrete analog implementation and/or a general purpose centralized digital signal processing (DSP) chip. The disadvantage of a discrete analog implementation is its inflexibility with regard to modifying component values for the purpose of "tuning" or customizing the control loops for a given sensor. Since mass-produced sensors will have some degree of variability amongst a batch of supposedly identical devices, this inflexibility represents a significant drawback. On the other hand, one disadvantage of using a general purpose digital signal processing chip is that general purpose centralized DSPs do not lend themselves to applications in which low power consumption is necessary (e.g., spacecraft, mobile systems, etc.).

There is a need for devices and methods for controlling and signal processing for vibratory gyroscopes which are flexible and adaptable to various vibratory gyro sensors. Further, there is a need for such devices and methods which allow easily customized control loops for such sensors. Finally, there is also a need for such devices and methods which operate at low power consumption levels. The present invention meets all these needs.

SUMMARY OF THE INVENTION

The present invention addresses these and other issues because it retains enough flexibility in its architecture to facilitate customization according to the dynamics of individual sensors and because its hardware implementation is such that the ASIC is a low-power integrated circuit.

Embodiments of the invention generally encompass a digital, application specific integrated circuit (ASIC) designed to perform excitation of a selected mode within a vibratory rate gyroscope, damping, or "force-rebalance," of other modes within the sensor, and signal demodulation of the in-phase and quadrature components of the signal containing the angular rate information. The ASIC filters may be individually programmed to accommodate different rate sensor designs/technology or variations within the same class of sensors. The ASIC architecture employs a low-power design, making the ASIC particularly suitable for use in power-sensitive applications.

A typical embodiment of the invention comprises a distributed digital control circuit device including a digital drive controller circuit for producing a drive signal for exciting a drive mode of a vibratory gyroscope to a substantially constant amplitude from a drive mode response signal, a digital rebalance controller circuit for producing a sense rebalance signal from a sense mode response signal to regulate a sense mode of the vibratory gyroscope to substantially zero and a digital demodulator for demodulating the sense rebalance signal with the drive mode response signal to produce a digital rate estimate of the vibratory gyroscope. The drive loop, the rebalance loop and the demodulator are implemented on a single application specific integrated circuit (ASIC). Typically, the digital drive controller circuit includes an automatic gain control for exciting the drive mode to the substantially constant amplitude.

The drive mode response signal and the sense mode response signal can be combined separately and input in the digital drive controller circuit and in the digital rebalance controller circuit to aid in isolating the drive and sense modes. Similarly, the digital drive signal and the digital sense rebalance signal can be combined separately at the loop output to excite the drive mode and regulate the sense mode to aid in isolating the drive and sense mode. In each case, the signals can be combined with a pair of programmable amplifiers or, in alternate embodiments, with a pair of programmable filters.

In order to accommodate gyroscope variability, the digital drive control circuit and the digital rebalance controller circuit are programmable such that the circuit device can be matched to a particular vibratory gyroscope. For example, the digital drive control circuit and the digital rebalance controller circuit can each include one or more programmable finite impulse response (FIR) filters programmed to match the particular vibratory gyroscope. In addition, the programmable digital drive control circuit and the programmable digital rebalance controller circuit can include one or more programmable amplifiers, such as those used at the input and/or output of the drive circuit and rebalance circuit to isolate the drive and sense modes of the gyroscope. Alternately, a programmable filter architecture can be employed to aid in isolating the drive and sense modes.

BRIEF DESCRIPTION OF THE DRAWINGS

Referring now to the drawings in which like reference numbers represent corresponding parts throughout:

FIG. 3B is a table showing electrical characteristics of a typical embodiment of the invention;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Exemplary Gyroscope Model

As discussed above, vibratory rate gyroscopes exploit a Coriolis term in the equations of motion to link two modes of the sensor's elastic structure. One mode is driven to a constant-amplitude harmonic response (requiring a drive loop) and consequently any angular motion about the sensor's sensitive axis causes the other mode to respond to this rotation. The amplitude of this response is related to the angular rotation rate. A second feedback loop, the balance loop, is often used to regulate the response of the second mode to zero and in this case the feedback signal contains information on the angular rotation rate that may be calculated by demodulating this signal with the driven mode's response.

Figure 1A:
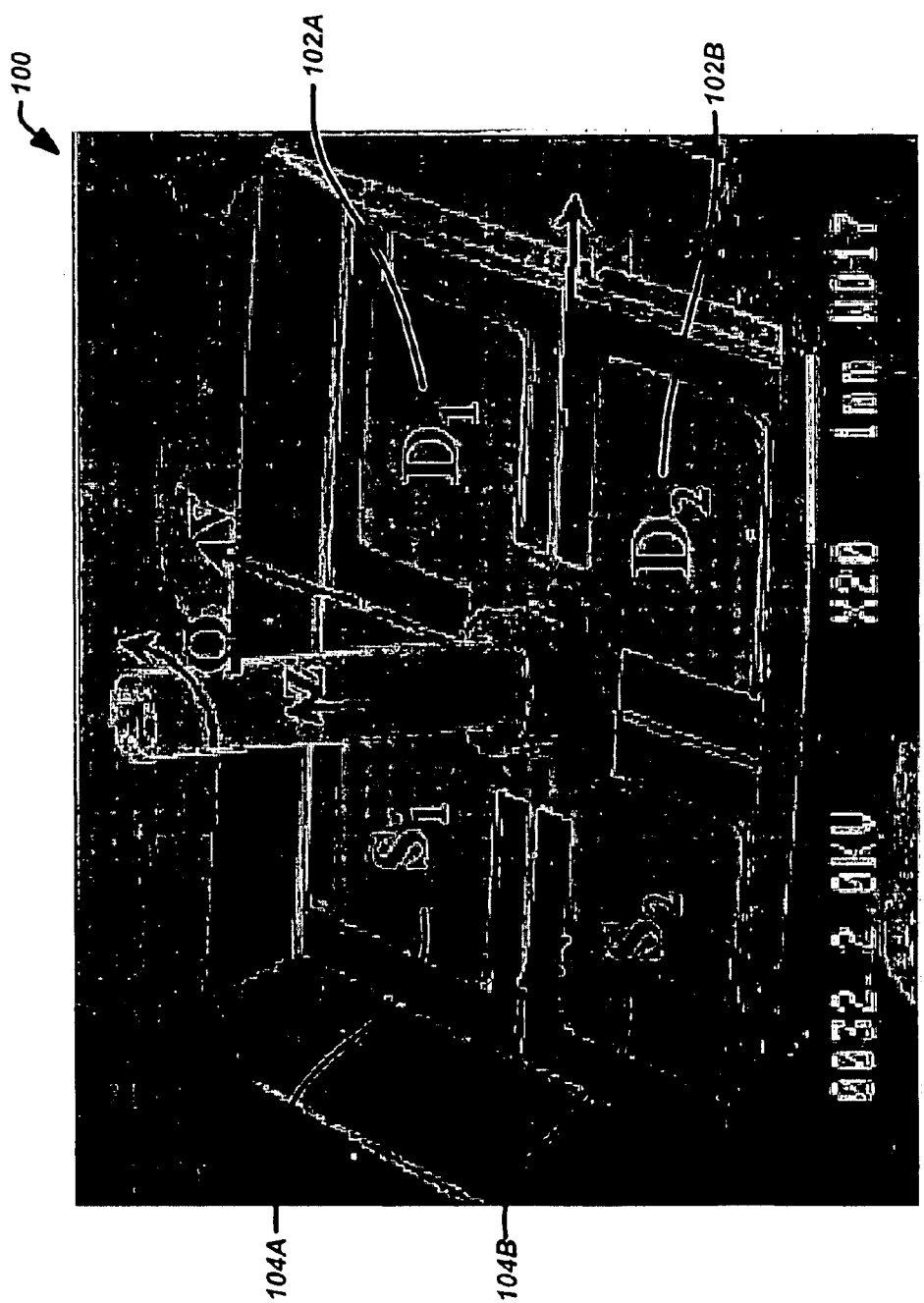
FIG. 1A is an exemplary vibratory gyroscope which can be used with the present invention.

FIG. 1A is an exemplary vibratory gyroscope which can be used with the present invention. The operation of this gyroscope 100 depends on a Coriolis coupling of one degree of freedom to another degree of freedom with the gyroscope 100. Excitation of the gyroscope 100 is achieved by applying an controlled electrical potential to the two drive electrodes 102A, 102B. In the exemplary gyroscope 100 shown, the drive electrodes 102A, 102B and the sense electrodes 104A, 104B are suspended by silicon springs above matching electrodes on the base plate 106. The large post 108 adds inertia which increases the sensitivity of the gyroscope 100 to rotational motion. The electrical potential between the drive electrodes 102A, 102B and their respective base plate electrodes creates an electrostatic force that, ideally, rocks the cloverleaf assembly about the y-axis. The amplitude of the rocking motion can be maximized by driving the electrodes 102A, 102B at the natural frequency of this degree of freedom, known as the drive rocking mode. If the gyroscope 100 is rotated about the z-axis with angular rate of rotation Q, then the rocking about y is coupled into rocking about the x-axis via Coriolis acceleration in the x-y frame fixed to the gyroscope 100. The rocking about the x-axis is referred to as the sense rocking mode and its motion is related to Q. In an ideal gyroscope, both the sense and drive rocking modes have equal frequencies and the nodal axes coincide with the x-axis and y-axis in the gyroscope 100 frame. However, fabrication irregularities may cause a split between the rocking mode frequencies as well as a change in orientation of the nodal axes with respect to the electrodes 102A, 102B, 104A, 104B.

The exemplary gyroscope 100 above is described U.S. Pat. No. 5,894,090 by Tang et al., which is incorporated by reference herein. Further details regarding gyroscope operation can be found in Tang, T. K. et al., "Silicon bulk micromachined vibratory gyroscope," Solid-State Sensor and Actuator Workshop, Hilton Head, SC, pp. 288–293, 1996; Tang, T. K et al., "Silicon bulk micromachined vibratory gyroscope for microspacecraft," Proc. of the SPIE—The International Society for Optical Engineering, Denver, Colo., vol. 2810, pp. 101–115, 1996; and Tang, T. K. et al., "A packaged silicon MEMS vibratory gyroscope for microspacecraft," Proc. IEEE, The Tenth Annual International Workshop on Micro Electro Mechanical Systems, Nagoya, Japan, pp. 500–505, 1997, which are all incorporated by reference herein. However, as will be understood by those skilled in the art, the invention described herein is applicable to most other vibratory gyroscopes. Other such applicable gyroscopes include, but are not limited to, a class of isolated resonator as described, for example, in U.S. patent application Ser. No. 09/928,279 by Challoner, filed Aug. 10, 2001, which is incorporated by reference herein.

In the identification of a frequency-domain sensor model, a general two-degree-of-freedom system can be considered as follows.

$$M\ddot{x}+C\dot{x}+Kx=BF \quad (1)$$

where the mass, damping, and stiffness matrices are positive definite matrices. The frequency of response of Equation (1) is $$Z(\omega)X=(-\omega^2 M+j\omega C+K)X=BF \quad (2)$$

where Z is a 2×2 complex-valued matrix at each c, called the impedance matrix, F is a column matrix containing the magnitude and phase of sinusoidal drive inputs, and X is a column matrix specifying the magnitude and phase of sinusoidal sense measurements.

Since the gyroscope 100 ideally measures rate and the voltage measurements from the sensing pick-offs are proportional to velocity, the gyroscope 100 dynamics are modeled in terms of the coordinates specified by the sense electrode pick-offs. This is especially important because error equations are developed with respect to this coordinate system. In addition, due to the non-collocation of the actuators with the sensors, B is defined as a non-identity input matrix that specifies how to blend the drive inputs to provide forces or torques that are collocated with the sense electrodes. An identification is performed by fitting the impedance model in Equation (2) to experimental frequency domain data for the rocking modes neighborhood using a least-squares algorithm to obtain the details of the mass, damping, and stiffness matrices.

Figure 1B:
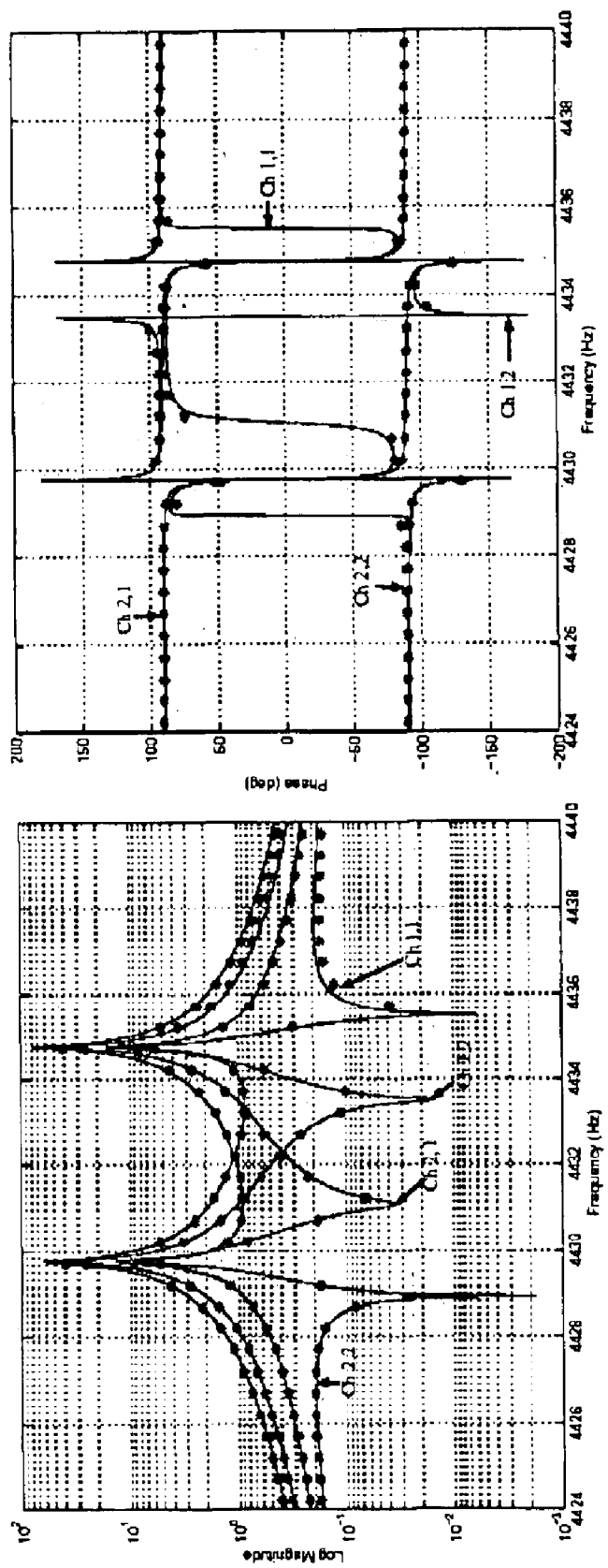
FIG. 1B displays the Bode magnitude and phase plots of the identified impedance model versus the experimental data.

FIG. 1B displays the Bode magnitude and phase plots of the identified impedance model versus the experimental data. This exemplary model can be used to design several control loops for the gyroscope 100. See e.g., M'Closkey, R. T. et al., "System Identification of a MEMS Gyroscope," J. Dynamic Sys. Meas. Control, Vol. 123, pp. 201, June 2001, which is incorporated by reference herein, for additional information on identification of this exemplary gyroscope 100.

2. Gyroscope Control

The exemplary gyroscope 100 as described above, like most vibratory rate sensors, requires two common control tasks, a drive loop control and a sense rebalance (or balance) loop. The drive loop control is necessary to excite a lightly damped degree of freedom to a substantially constant amplitude. This arises from the fact that the gyroscope 100 is inherently sensitive to environmental perturbations. In particular, sensor properties such as modal frequencies, can vary significantly with temperature. Therefore, it is desirable to employ a technique that can successfully excite a selected mode into harmonic oscillation without requiring a precise estimate of the modal frequency.

Thus, the drive loop task can be accomplished by including a nonlinear control system such as an automatic gain control (AGC). The underlying principle of the AGC is that an estimate of the velocity of the mode that is selected for excitation is fed back to the actuators which drive that mode. The sign and multiplicative gain of the velocity measurement is used to either add energy by destabilizing or dampen the modal response until the desired amplitude is attained. At a basic level, the AGC uses a rectifier and lowpass filter for signal amplitude detection, a comparator for generation of an error signal, a proportional-integrator block to drive the amplitude error to zero, and a multiplier to adjust the velocity feedback gain. Analyses of the AGC implemented with a commercial DSP can be found in M'Closkey, R. T. et al., "Analysis of a microsensor automatic gain control loop," Proc. 1999 American Control Conference, San Diego, Calif., vol. 5, pp. 3307–3311, 1999 and M'Closkey, R. T. et al., "Mode localization induced by a nonlinear control loop," Nonlinear Dynamics, vol. 25, no. 1, pp. 221–236, 2001, which are incorporated by reference herein.

In the balance loop, an angular rotation rate of the sensor produces a sinusoidal sense rebalance signal, regulating the sense mode response to zero at the drive loop frequency. The amplitude of the sense rebalance signal is proportional to $\Omega$, the angular rate of the gyroscope. Detection of the angular rate is accomplished by demodulating the sense rebalance loop signal with the measurement of the drive mode from the drive loop response. Both control tasks require an identified model of the sensor dynamics for implementation.

ASIC embodiments described by this invention perform the two feedback control tasks discussed above, automatic gain control (AGC) for regulating the harmonic response of the driven mode (i.e., a drive loop), and a rebalance loop to regulate the motion of the second mode to zero and the signal demodulation tasks for recovering the angular rotation rate of the sensor.

Figure 1C:
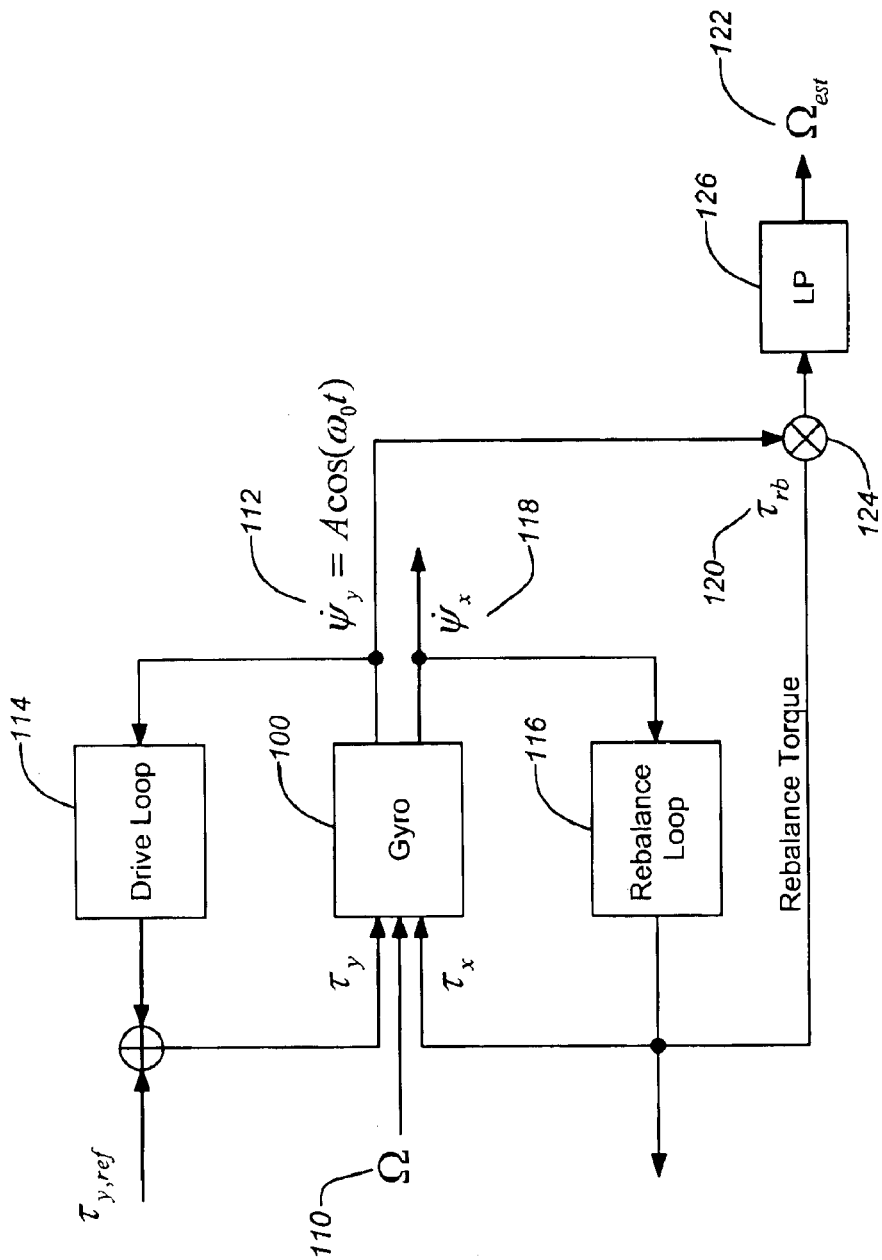
FIG. 1C is a block diagram of the general control loops implemented in embodiments of the invention.

FIG. 1C is a block diagram revealing exemplary feedback loops and one demodulation stage. The gyro 100 undergoes an input angular rotation rate $\Omega$ 110. The response $\dot{\psi}_y$ 112 of the driven mode responding harmonically from the drive loop 114 is denoted as $$\dot{\psi}_y = A\cos(\omega_o t) \quad (3)$$

The rebalance loop 116 regulates the second mode's response $\dot{\psi}_x$ 118, to zero with the feedback signal $\tau_{rb}$ 120. Demodulating 124 $\tau_{rb}$ 120 with respect to $\dot{\psi}_y$ 112 provides an estimate of the rate $\Omega_{est}$ 122, which can be conditioned by the lowpass filter 126. A typical ASIC embodiment of the invention combines the drive loop 114 control, rebalance loop 116 control, and demodulation into a low-power, small-footprint, programmable digital device.

The ideal gyro dynamics would yield scalar times identity mass, stiffness, and damping matrices. Due to manufacturing tolerances, however, it is not realistic to expect such symmetry; the drive mode and sense mode frequencies will differ and each sensing pick-off will detect both drive mode and sense mode response signals. Similarly, each electrostatic actuator would couple into each mode. The coupling of each mode into the pick-offs and actuators is evident in the Bode plots of FIG. 1B. To accommodate the split in drive mode and sense mode frequencies, bias electrodes can be used to perturb the sensor dynamics and reduce the frequency split to zero. Each mode can be decoupled into its own measurement/actuation channel when some frequency split is present.

Decoupling each mode is essentially a coordinate transformation of the model of Equation (1) that was identified in the "pick-off" coordinates. In other words, input signals to the drive and rebalance loops can be created by combining the pick-off (drive and sense mode response) signals appropriately weighted to each loop. Likewise, the two output signals (the drive and sense rebalance signals) can formed from a weighted combination of the outputs of the drive and rebalance loops to drive their own separate mode leaving the other mode undisturbed. Beginning with Equation (1), the output transformation is defined $$T_{out} = TM^{-1/2}, \quad (4)$$

where $T^T \Lambda_K T = M^{-1/2} K M^{-1/2}$ and $\Lambda_K$ is the matrix of generalized eigenvalues of M and K. Similarly, the input transformation is defined as $$T_{in} = B^{-1} M^{1/2} T^T, \quad (5)$$

Pre- and post-multiplying Equation (1) by $T_{in}$ and $T_{out}$, respectively, will decouple each mode into its own measurements/actuation channel to the degree permitted by the damping in the device. For the exemplary gyroscope 100, the decoupling matrices are calculated to be approximately $$T_{in} = \begin{bmatrix} 0.6162 & -0.7695 \\ -0.5693 & -0.7166 \end{bmatrix}, T_{out} = \begin{bmatrix} 1.3095 & 0.0852 \\ -0.1086 & 1.0812 \end{bmatrix} \quad (6)$$

Note that both of these transformations are well-conditioned and thus will not produce a closed-loop system with excessive sensitivity to modeling errors.

Figure 1D:
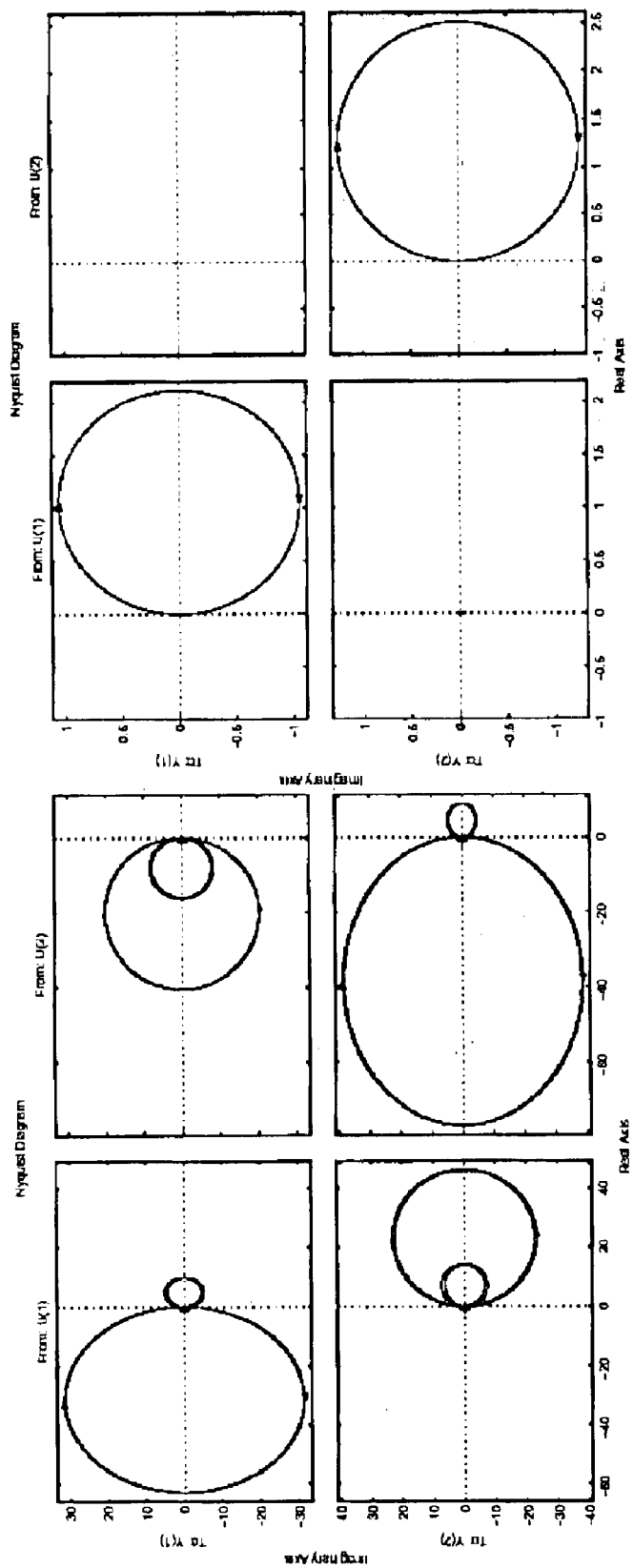
FIG. 1D shows a comparison between the identified model and the decoupled model.

FIG. 1D shows a comparison between the identified model and the decoupled model. The decoupling can be achieved with a programmable analog network. Although the ASIC embodiment described hereafter can perform this task, an analog network is selected to provide access to the decoupled signals. The off-diagonal terms in the decoupled model have been reduced to essentially zero, and the loops in the (1,1) channel and (2,2) channel represent the separate rocking modes. The higher-frequency rocking mode (approximately 4427.8 Hz) is in the (1,1) channel. This is designated as the drive mode that will be excited by the AGC control loop. The lower-frequency rocking mode (approximately 4422.7 Hz) is in the (2,2) channel. This is designated as the sense mode and will be regulated by the rebalance loop controller.

Figure 1E:
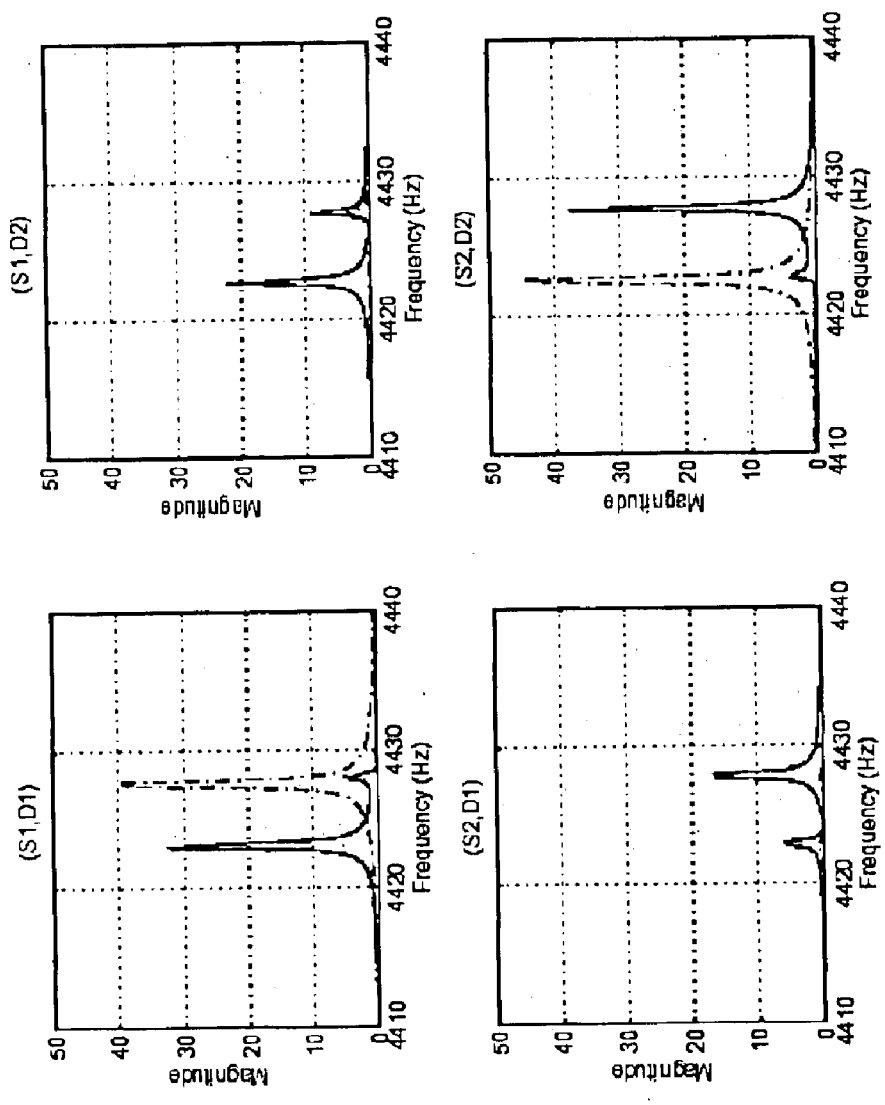
FIG. 1E shows experimental results of the effectiveness of the decoupling.

FIG. 1E shows experimental results of the effectiveness of the decoupling. A dynamic signal analyzer is used to produce both traces. The solid trace represents the gyro frequency response magnitude using the unmodified pick-offs and actuators. These results are comparable to that of FIG. 1B. The dashed trace shows the results of blending these signals via the decoupling matrices: each mode is isolated to its own channel with very little coupling in the off-diagonal terms. Now that the two rocking modes are separated, the control design for each loop can be initiated. The nonlinear Automatic Gain Control (AGC) loop, which regulates the amplitude of the higher frequency mode, is closed around the (1,1) channel in the decoupled system. A linear loop can be designed to regulate the lower frequency mode response to zero closed around the (2,2) channel. The exemplary gyroscope 100 also possess an "up-down" mode (displacement in the z-axis direction in FIG. 1A) that must be damped. The linear controller designed for the (2,2) channel also regulates this mode.

3. Exemplary Gyroscope Control ASIC

A typical ASIC embodiment of the present invention comprises a single digital chip solution for current and future vibratory rate gyroscopes including MEMS gyros. Applicable gyros are under development at several companies (e.g., Analog Devices, Draper, etc.) and government labs (e.g., Jet Propulsion Laboratory). The ASIC possesses fully integrated digital processing, a flexible interface to commercial analog-to-digital (A/D) and digital-to-analog (D/A) converters, high data precision for low distortion, and a low-power, small-area implementation.

Figure 2A:
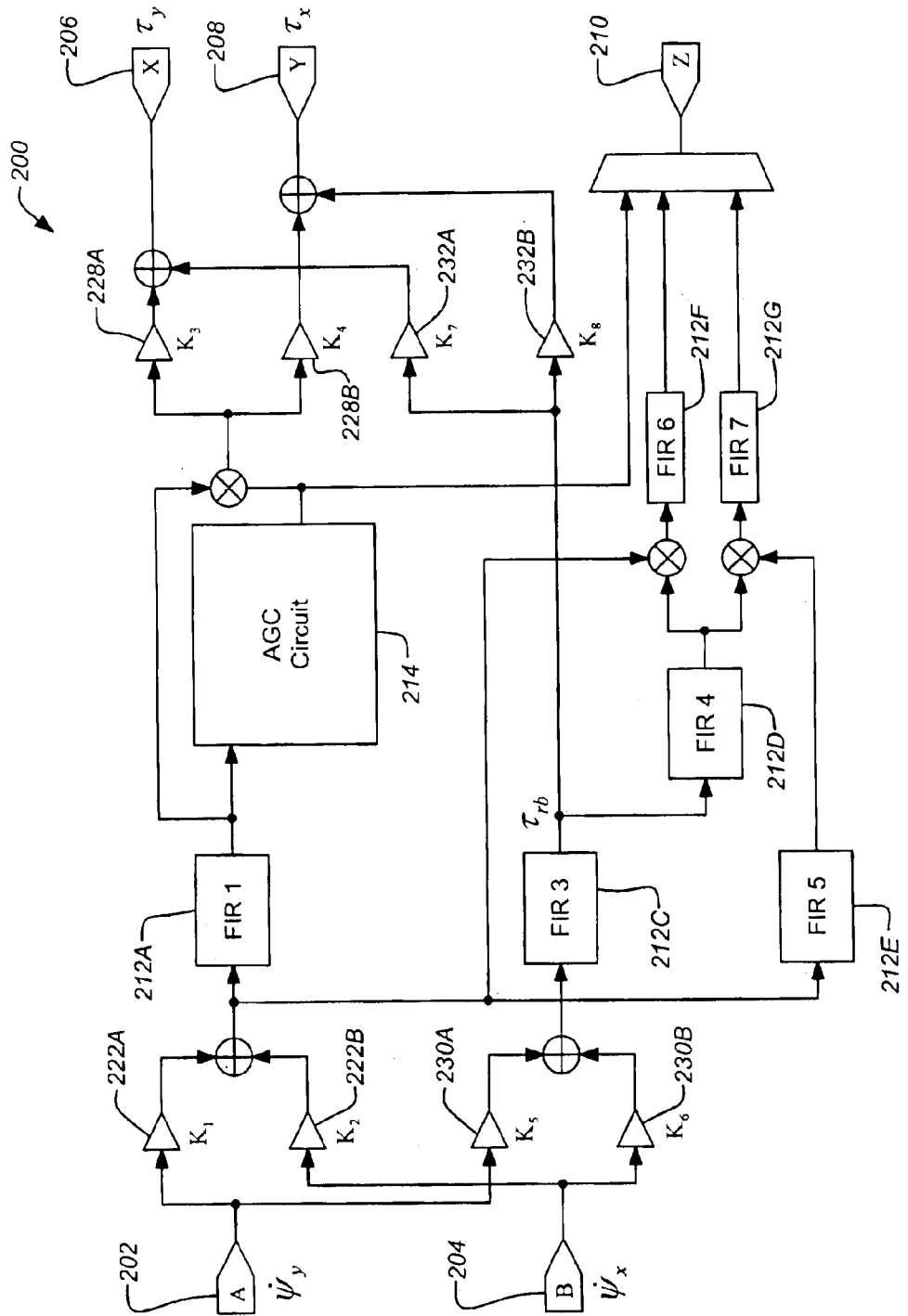
FIGS. 2A–2B are block diagrams of the architecture of an exemplary embodiment of the invention.

FIG. 2A is a block diagram of the architecture of an exemplary embodiment of the invention. The input signals to the ASIC 200 are denoted by the A (drive) and B (sense) channels 202, 204, respectively. The ASIC 200 outputs are the X (drive), Y (balance), and Z channels 206, 208, 210, respectively. The exemplary ASIC 200 employs seven fully programmable finite impulse response filters (FIRs) 212A–212G.

Figure 2B:
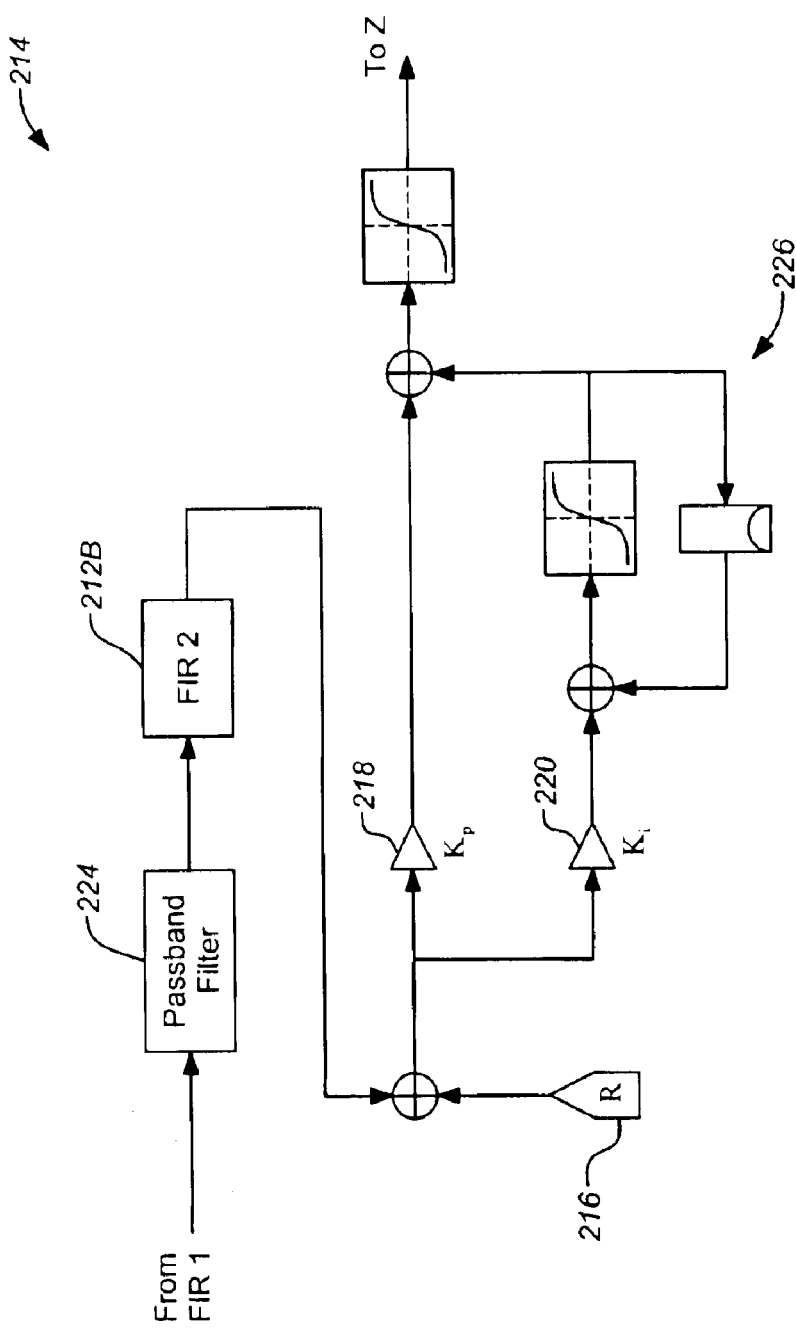

FIG. 2B is a block diagram of the AGC loop 214 of the ASIC 200. FIR 212B is included in the AGC circuit 214. The signal path, comprising FIR 212A, FIR 212B, a programmable reference level 216 R, amplifier 218 with gain Kp, and amplifier 220 with gain Ki, implements the automatic gain control (AGC) loop that regulates a selected mode to a stable sinusoidal response. This mode may be isolated from the A and B input channels 202, 204 by blending these signals via the K1 and K2 programmable gains of respective amplifiers 222A, 222B. If other modes are present, but spectrally separated from the desired mode, then FIR 212A can also include a passband filter 224 to isolate the desired mode. Note that the passband filter 224 is depicted in FIG. 2B as a separate element from FIR 212B and FIR 212A (of FIG. 2A) as a logical device. However, the passband filter 224 can be "physically" inside FIR 212B and/or FIR 212A as a function of their programming. FIR 212B, the programmable reference level 216, gains Kp and Ki may be programmed to adjust the closed-loop bandwidth and transient response of the mode. The Kp and Ki gains represent the proportional-integral controller that regulates the mode amplitude (Ki is followed by an accumulator 226 that can drive any steady-state amplitude error to zero). The output of this control loop is used to drive the X and Y channels 206, 208. The gains associated with the amplifiers 228A, 228B of these channels, denoted K3 and K4, respectively, can be selected to drive certain modes. The appropriate gains depend upon the physical configuration of the electrodes within the gyro sensor.

The rebalance loop, which regulates the second mode to zero, is achieved with FIR 212C. The amplifiers 230A, 230B have gains K5 and K6, respectively, to isolate the second mode to the path served by FIR 212C. FIR 212C can also be used to dampen other modes present within the gyro sensor. The output of this control loop also drives the X and Y channels 206, 208 via the programmable gains K7 and K8 of respective amplifiers 232A, 232B. FIR 212D and FIR 212E are used to adjust the signal phase prior to demodulation. For example, FIR 212E can be a 90° phase shift filter. FIR 212F and FIR 212G complete the signal demodulation and are typically selected to be low-pass filters, although the programming flexibility of the ASIC 100 permits any general FIR filter to be implemented. FIR 212F produces the in-phase signal term and FIR 212G produces the quadrature signal term. The demodulated signals are available from the Z channel 210. All amplifier gains and FIR coefficients are programmable and hence can be easily adapted to the specific features of individual gyro sensors.

It should be noted that additional flexibility in application of the ASIC 100 can be achieved by configuring filters FIR 212A, 212C, 212E shown in FIG. 2A as multi-rate filters by providing a programmable integer decimation factor in addition to the filtering operation. A side benefit of the decimation may be reduced power consumption since the remainder of the core will run at lower data rates.

ASIC embodiments, such as the exemplary ASIC 100 described, can be fabricated using available low production run manufacturing services (e.g., MOSIS prototyping, www.mosis.org), however, large scale production is typical to maximize value.

The following technical specification summary describes an exemplary ASIC embodiment of the invention. The ASIC should be multi programmable, with variable length FIR filters (e.g., up to 128 coefficients each). The ASIC should include programmable scaling factors and gains (e.g., K1, K2, etc.). Input and output data and coefficient precision should each be 18 bits or better. Internal data precision should be 20 bits or better and 24 bits or better in the accumulator. The ASIC should include programmable external interfaces to the A/D and D/A converters. A max clock speed of 30 MHz or better should be employed.

A physical implementation of the exemplary ASIC 100 is detailed in the following table.

| Name | Value | Units |
| --- | --- | --- |
| Technology | 0.25 | $\mu m$ |
| Power Supply | <2.5 | V |
| Core Area | 2.8 | $mm^2$ |
| Die Area | 6.67 | $mm^2$ |
| Inputs/Outputs | 20 | |
| Power pins | 8 | |
| System Gates | 26,000 | |
| Transistor Count | 650,000 | |

The ASIC architecture as shown in FIGS. 2A and 2B can meet the demand in spacecraft applications for low power consumption and high-speed computation. There are two control loops in its topology, the AGC loop and rebalance loop, and two signal demodulation stages for detecting rate-induced signals. Each of the seven FIR filters can be independently programmed with up to 128 coefficients. If the ASIC operates at a sample rate of 48K-Hz, a supply of 2.5V, and all 896 FIR coefficients are loaded, it consumes a mere 13.8 mW of power.

Figure 3A:
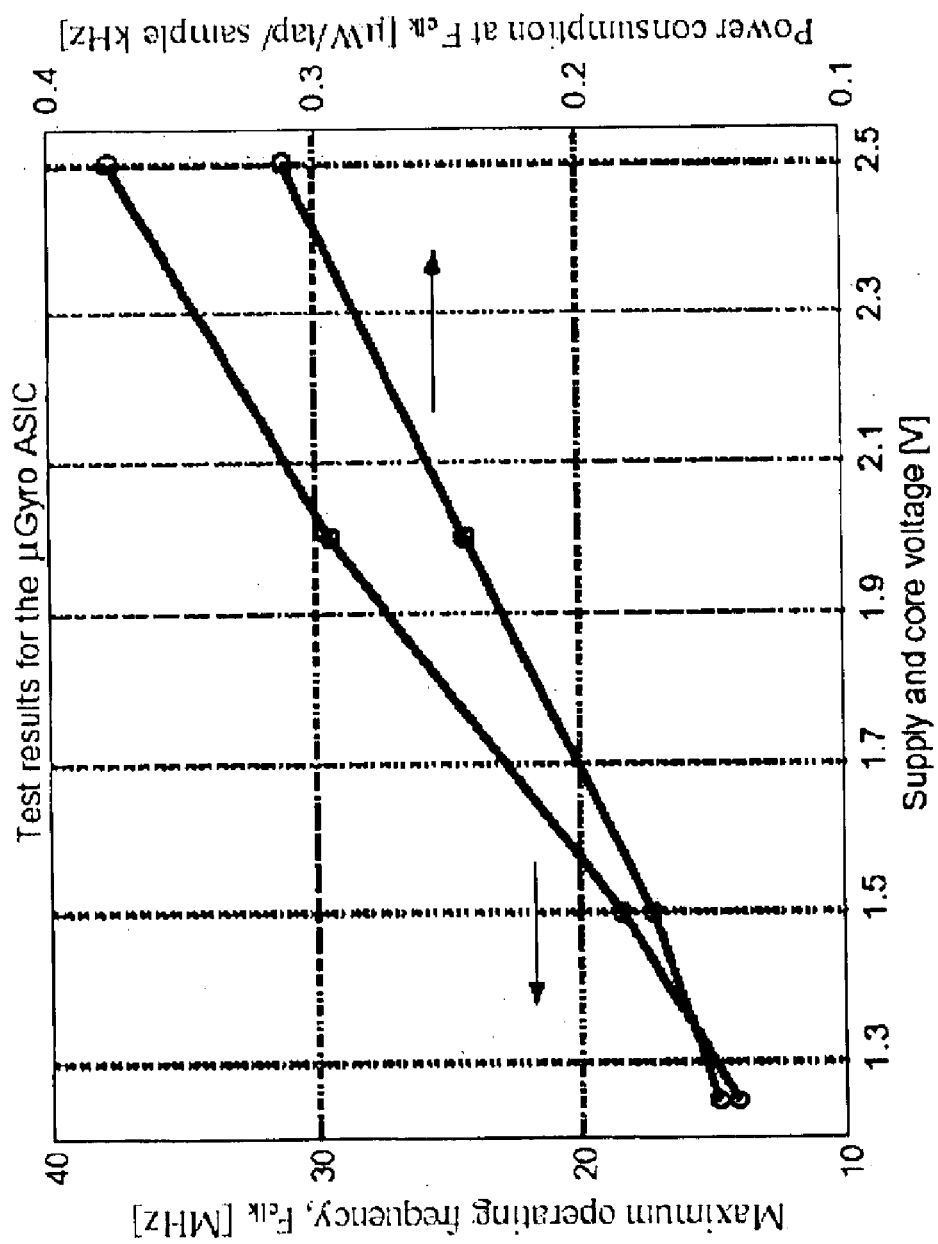
FIG. 3A is an exemplary plot of the power consumption and maximum operating frequency for a typical embodiment of the invention.

FIG. 3A is an exemplary plot of the power consumption and maximum operating frequency for a typical embodiment of the invention. FIG. 3B is a table showing electrical characteristics of a typical embodiment of the invention.

Gains K1 through K8 can chosen to adjust loop gains and can be used to isolate the drive and sense modes. In the AGC stage, the signal phase is shaped by FIR 212A and represents a signal that is in-phase with the drive mode velocity in the decoupled system. Tracing out the top portion of the diagram shows that this signal is rectified and passed through a low-pass filter (FIR 212B) to produce an estimate of the drive mode response amplitude. The amplitude is compared to the programmable reference level 216, R, and the resulting error signal is the input to a PI stage (represented by amplifiers 218, 220). The output of this stage then modulates the drive mode signal before it is fed back to the actuators.

The rebalance loop controller is implemented with FIR 212C and is designed to effectively dampen the sense mode and up-down mode by adjusting the phase of the loop to produce signals that mimic the velocity of these modes; feeding this signal back to the drive electrodes introduces damping into these modes.

Figure 3C:
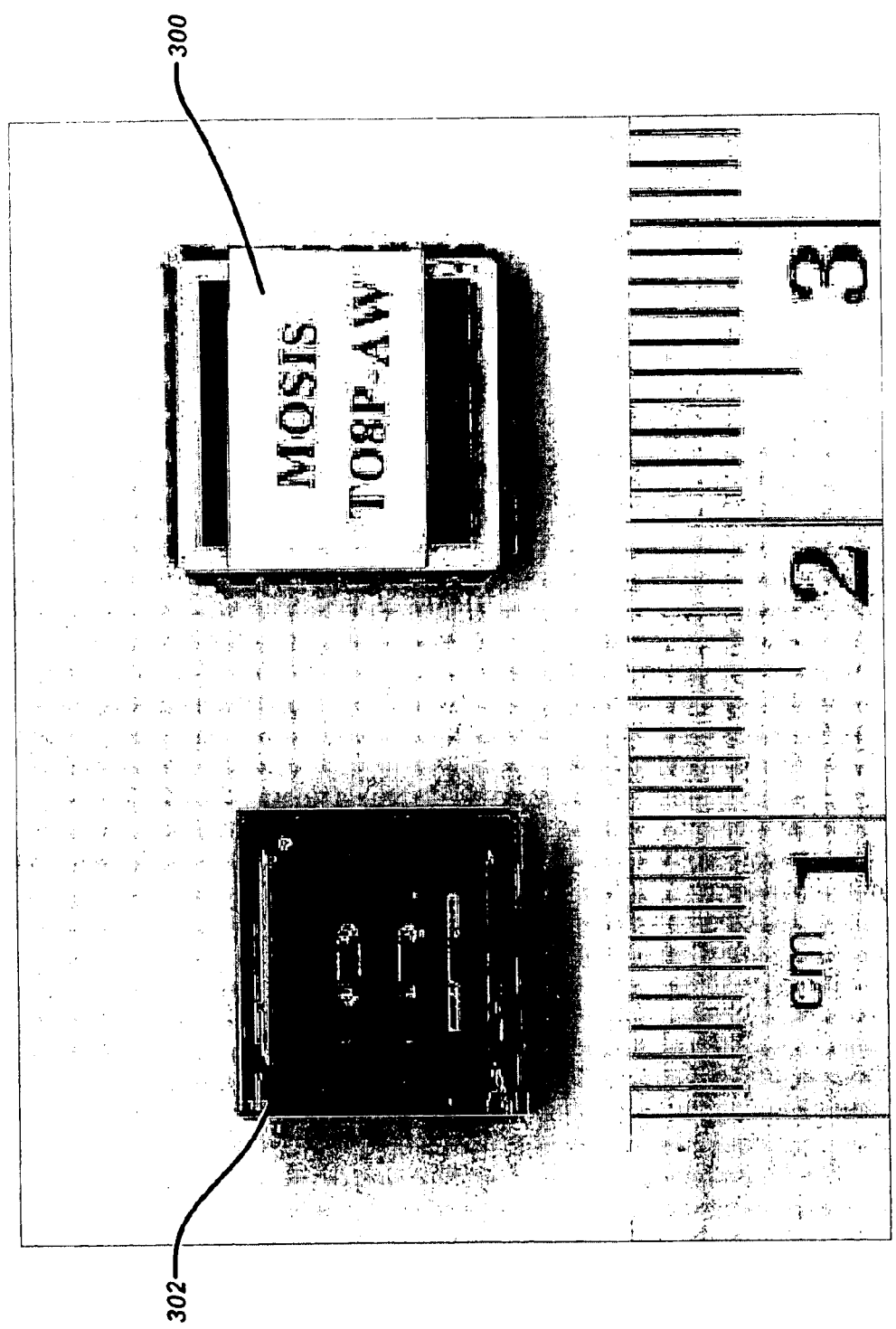
FIG. 3C is an image of a exemplary ASIC and a vibratory gyroscope.
Figure 3D:
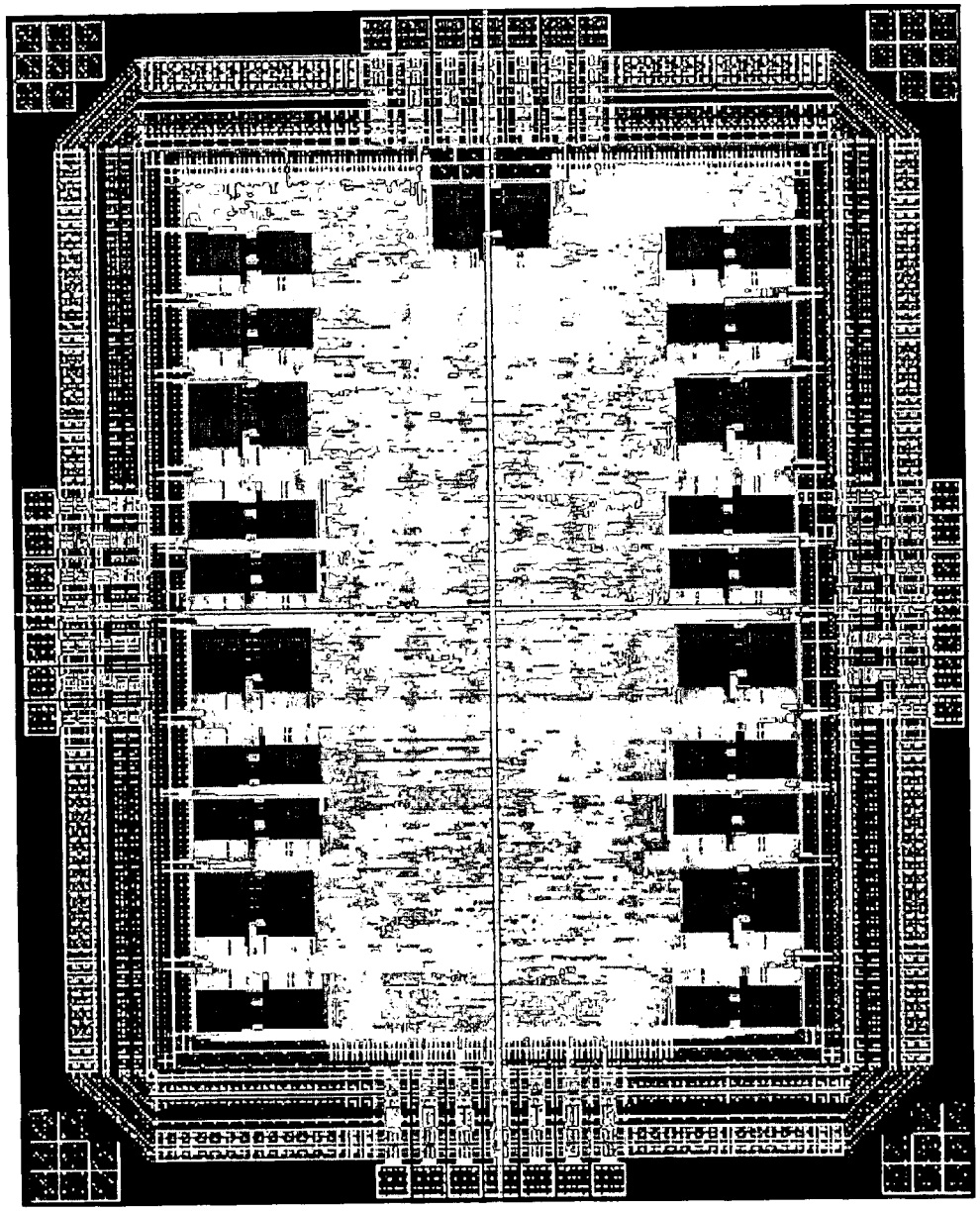
FIG. 3D is an image of a typical circuit layout included within the ASIC.

FIG. 3C is an image of a exemplary ASIC 300 and a vibratory gyroscope 302. FIG. 3D is an image of a typical circuit layout included within the ASIC 300. The exemplary ASIC 300 is in a 28 pin LCC package. Each device 300, 302 is only approximately 1 cm on a side. Additional details on the design of the ASIC may be found in Grayver, E. et al., "Automatic gain control ASIC for MEMS gyro applications," Proc. 2001 American Control Conf., Vol. 2, pp. 1219–22, June 2001, which is incorporated by reference herein.

The chip architecture can also be modified to replace the amplifiers 222, 228, 230 and 232 (gains K1 through K8) by programmable filters (e.g., FIR filters). This will allows even greater freedom in specifying the control loop parameters since variations in A and B signals' gain as well as phase may be separately compensated. Similarly, any control electrode dynamics can be compensated with this modification too. Additional input channels (augmenting A and B) and output channels (augmenting X and Y) can add even more flexibility in terms of blending measurement and control electrode signals. The current FIR length of 128 coefficients is adequate for most applications, however, longer filters may be desirable under certain circumstances. Similarly, the data precision may be increased from 20 bits (internally) to further mitigate the effects of the fixed-precision computation.

Embodiments of the invention provide a low-power implementation of the control loops and signal processing tasks that are not achieved at the expense of a flexible filter structure. In addition, the control loops and signal processing tasks implemented in the invention can be adapted to different vibratory rate sensors.

Notably, the low power consumption makes the ASIC attractive for portable applications, while its programmable features permit compensation of a variety of sensor dynamics. This is particularly significant since mass-produced sensors will have some degree of variability amongst a batch of supposedly identical devices. Standard diagnostic tools can identify these differences and then the FIR filters and gains can be designed and downloaded to the ASIC. To accomplish this task with analog components would require the specification of different resistor values, capacitor values, etc. for each sensor.

4. Gyroscope ASIC Interface and Operation

Figure 4A:
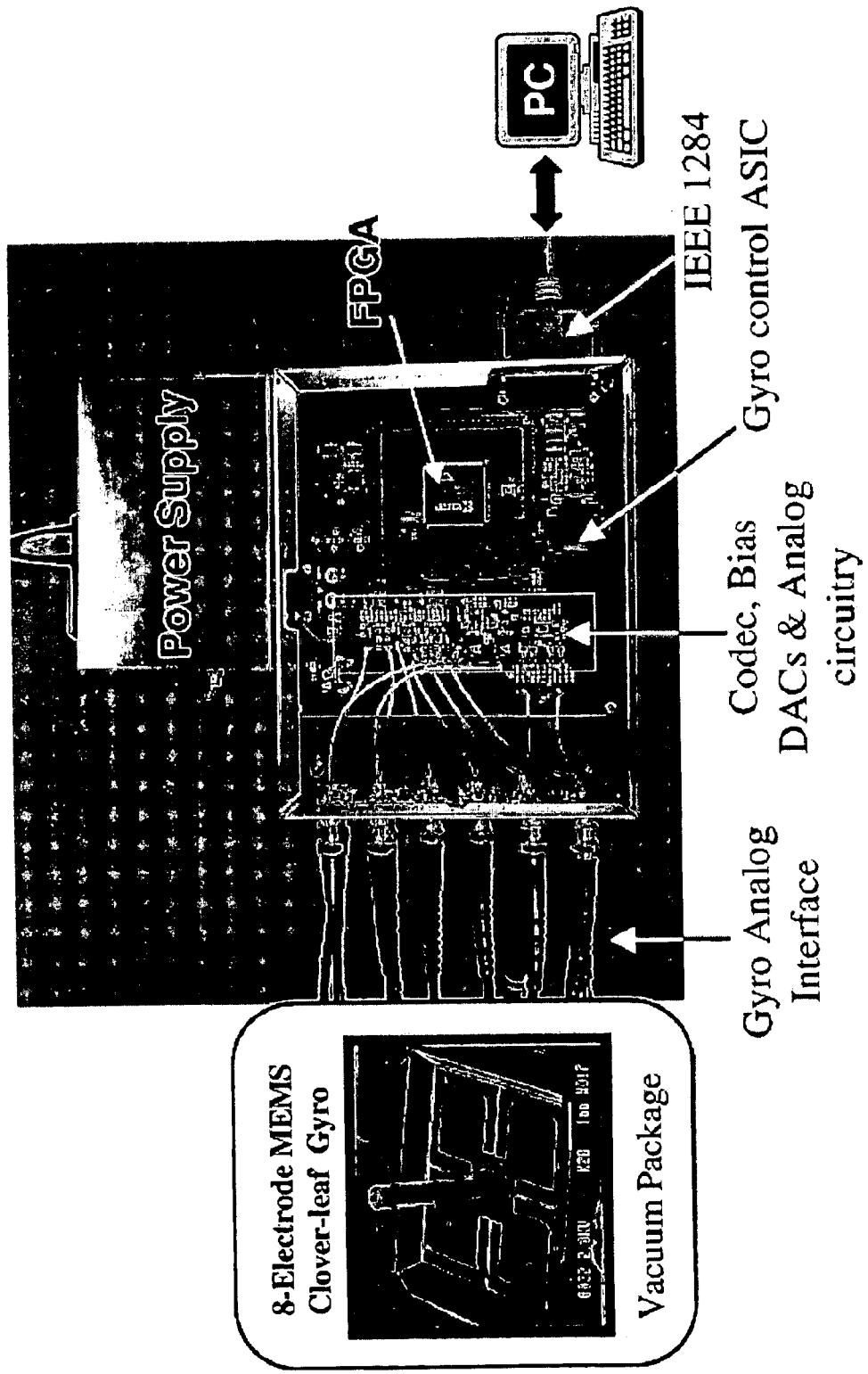
FIG. 4A illustrates a breadboard hosting the ASIC provides an exemplary infrastructure for interfacing the digital ASIC to the analog signals of the gyro.

FIG. 4A illustrates a breadboard hosting the ASIC provides an exemplary infrastructure for interfacing the digital ASIC to the analog signals of the gyro. The board includes audio Codec chips having 24-bit stereo analog-to-digital converters (ADCs) and digital-to-analog converters (DACs), analog anti-aliasing and smoothing filters, six 12-bit ADCs for gyro biasing, three with a high-voltage (−10V to +50V) output range, and a XILINX SRAM-based field-programmable gate array (FPGA). The FPGA contains digital logic for a personal computer interface via an IEEE 1284 enhanced parallel port (EPP), logic for setting the bias DACs, configuring the Codecs, and configuring and monitoring the ASIC. The FPGA also includes circuitry to synchronize data flows between the ASIC and the Codec. This breadboard is used for closed-loop testing and control algorithm development. However, functionally comparable hardware can be implemented in a finished operational unit.

Figure 4B:
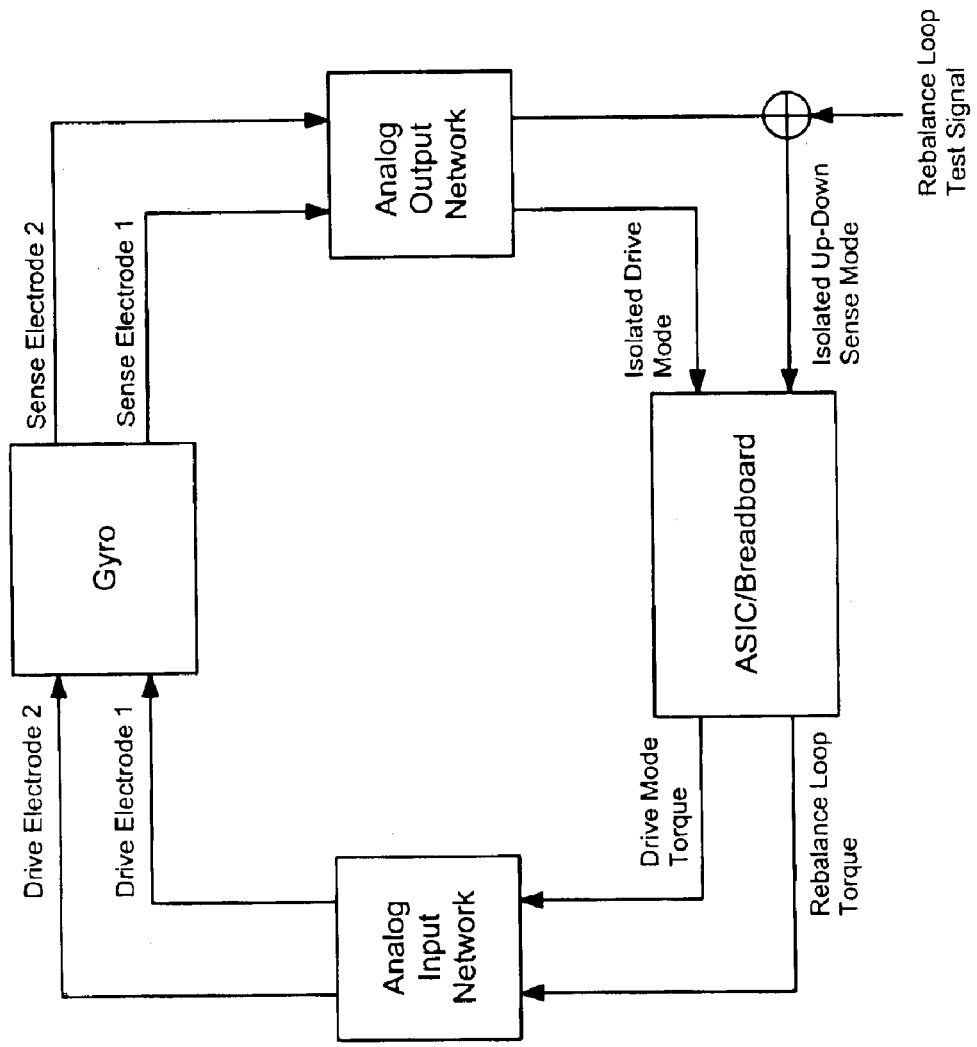
FIG. 4B shows the signal relationships and definitions of the closed-loop responses of the gyro under ASIC control.

FIG. 4B shows the signal relationships and definitions of the closed-loop responses of the gyro under ASIC control. The analog networks in FIG. 4B implement the decoupling matrices that are determined from the gyro model. The isolated modes are sampled by the ASIC/breadboard and produce, at each sampling instant, the appropriate actuator signals to regulate these modes. The ADC/DAC hardware is primarily used in high fidelity audio systems and this fixes the sample rate for the controllers at 48 kHz. This servo rate is quite adequate for regulating the rocking modes near 4.4 kHz.

The Codec chips that are used for analog signal conversion introduce significant transport delay into the loop (approximately 1 ms of delay). This delay is tolerable in open-loop applications like high-end audio equipment, however, care must be exercised when closing loops around a process. The microgyro dynamics, though at relatively high frequencies for a mechanical system, represent a very narrow-band process since the loop gain can be made larger than unity only in a very narrow region encompassing the gyro modes. Thus, compensation can be designed to shape the phase of the loops at these few target frequencies. Recall that the objective of the rebalance loop is to dampen the sense mode at approximately 4422.7 Hz and the up-down mode at approximately 2706.0 Hz. To achieve this objective, an FIR for each mode may be separately designed and then combined into one filter. Each FIR isolates its designated mode using a narrow passband filter in conjunction with an all-pass factor for phase shaping. The band-pass filters are effective because the up-down mode and sense mode have large spectral separation.

Figure 4C:
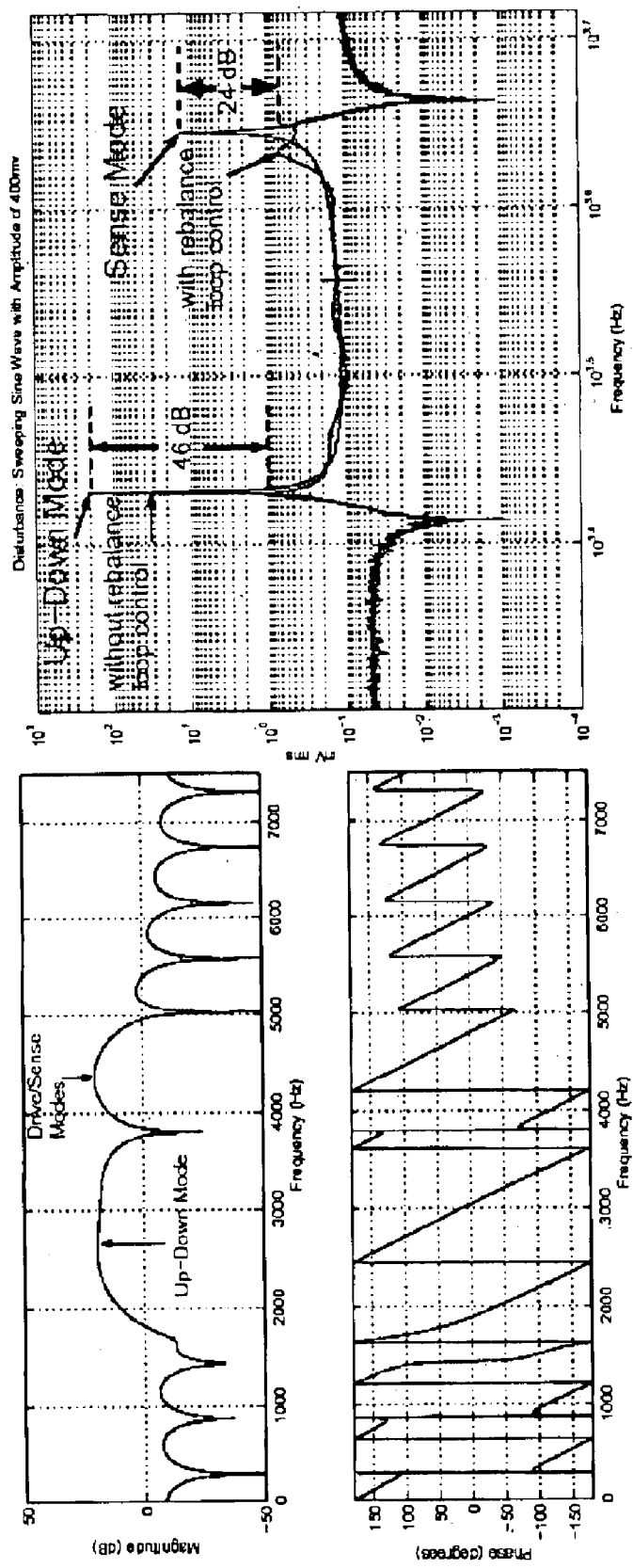
FIG. 4C shows the frequency response of the rebalance loop filter.

FIG. 4C shows the frequency response of the rebalance loop filter (FIR 212C). FIG. 4C also shows the performance of the rebalance loop compared to the open-loop case—the disturbance signal is summed into the channel representing the isolated up-down and sense modes (as indicated in FIG. 4B). The open-loop results are measured by breaking the rebalance loop just before the summation. The ASIC is able to achieve approximately 46 dB of attenuation in the up-down mode and approximately 24 dB of attenuation in the sense mode.

The design of FIR 212A, which serves the AGC loop, is very similar to the damping designs implemented by the rebalance loop. This filter shapes the phase of the loop and isolates the drive mode from the up-down mode (the sense mode is effectively eliminated via the analog decoupling networks). The phase of the loop gain when the drive mode response is small must be chosen so that the closed-loop system is unstable. This can be achieved by shaping the phase of the drive mode to simulate "anti-damping". The initial loop gain determines how aggressively the drive mode is destabilized in the closed-loop system. The amplitude of the drive mode is detected via the rectifier and FIR 212B. FIR 212B is a low-pass filter with a 50 Hz corner frequency and at least 50 dB of attenuation in the stop band. The PI stage regulates the sign and magnitude of the feedback signal to achieve a stable limit cycle with prescribed amplitude.

Figure 4D:
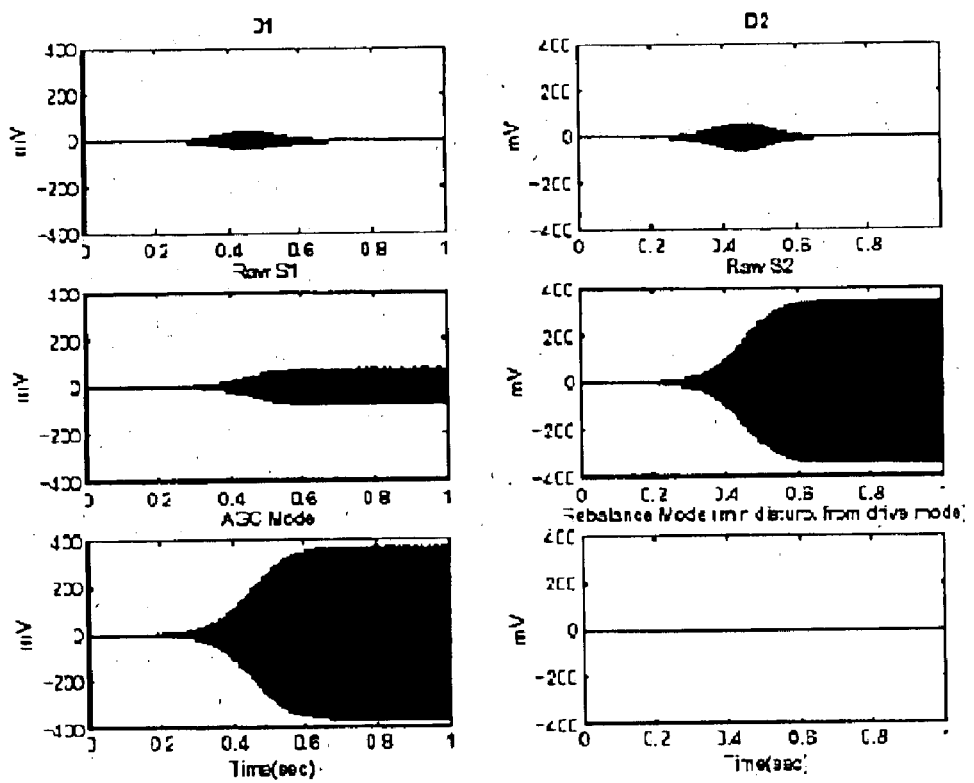
FIG. 4D shows several tests of the AGC loop exciting the drive mode.
Figure 4D:
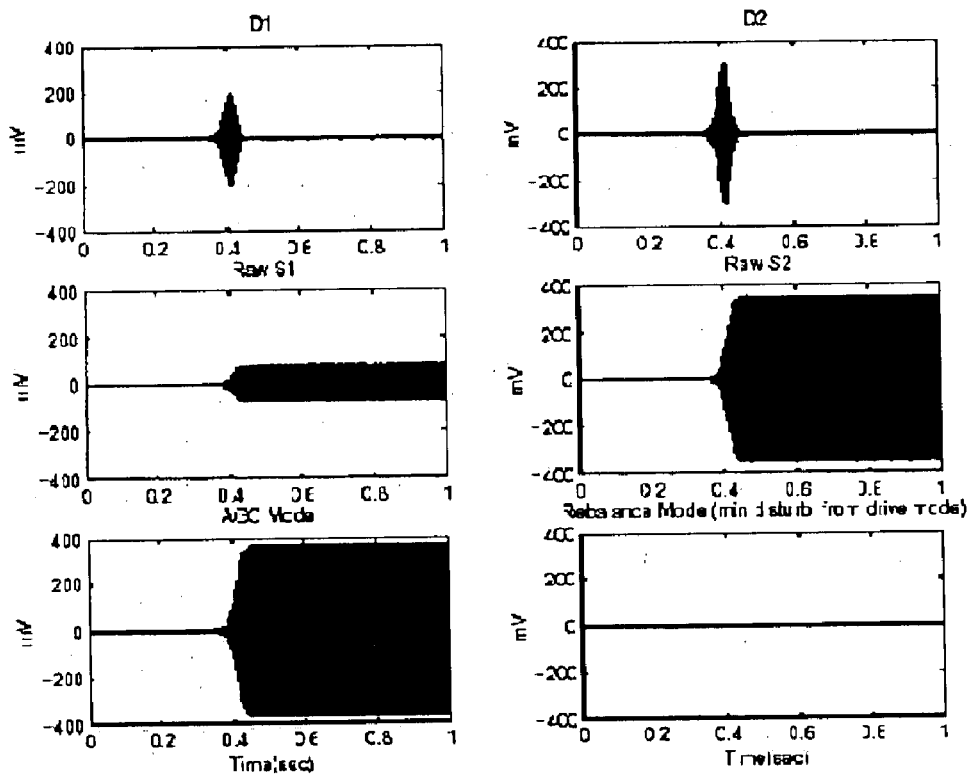

FIG. 4D shows several tests of the AGC loop exciting the drive mode. The "raw" signals measured from the gyro pick-offs are displayed as well as the isolated modes. The two tests demonstrate different loop bandwidths. The figure on the left has lower gain and, hence, the excitation of the drive mode (evident from the response envelope) occurs at a slower rate than the figure on the right. The sense mode is undisturbed by the excitation of the drive mode.

Figure 4E:
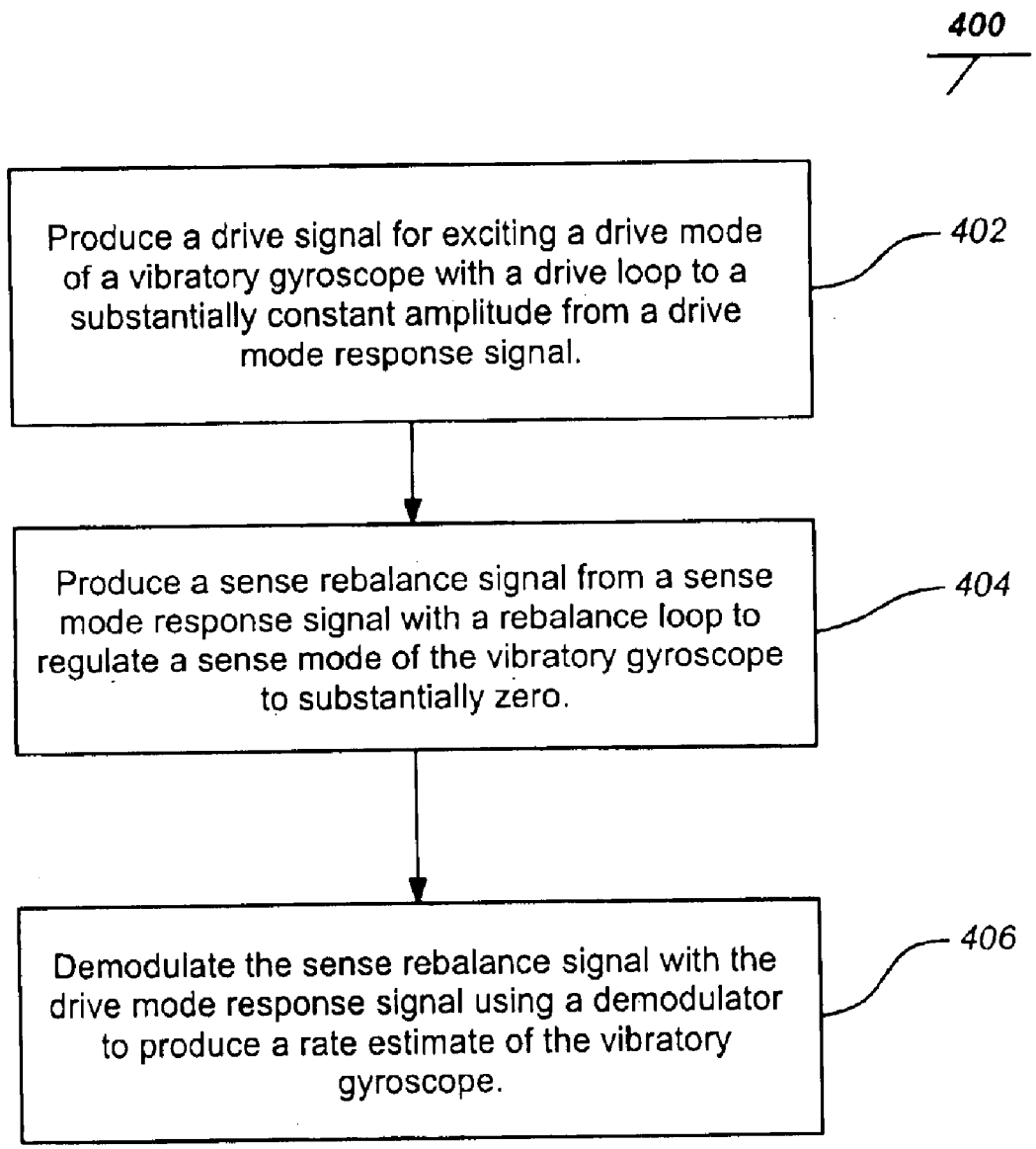
FIG. 4E is a flowchart which illustrate an exemplary method of the invention.

FIG. 4E is a flowchart which illustrate an exemplary method 400 of the invention. The method 400 begins at step 402 where a drive signal is produced for exciting a drive mode of a vibratory gyroscope with a drive loop to a substantially constant amplitude from a drive mode response signal. At step 404 a sense rebalance signal is produced from a sense mode response signal with a rebalance loop to regulate a sense mode of the vibratory gyroscope to substantially zero. At step 406, the sense rebalance signal is demodulated with the drive mode response signal using a demodulator to produce a rate estimate of the vibratory gyroscope. In further embodiments, the drive mode response signal and the sense mode response signal can be separately combined in the drive loop and in the rebalance loop each with a pair of programmable amplifiers or programmable filters. In addition, the method can be further modified consistent with the exemplary devices previously discussed.

The foregoing description including the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A circuit device comprising:
a digital drive controller circuit for producing a drive signal for exciting a drive mode of a vibratory gyroscope to a substantially constant amplitude from a drive mode response signal;
a digital rebalance controller circuit for producing a sense rebalance signal from a sense mode response signal to regulate a sense mode of the vibratory gyroscope to substantially zero; and
a digital demodulator for demodulating the sense rebalance signal with the drive mode response signal to produce a digital rate estimate of the vibratory gyroscope;
wherein the digital drive controller circuit, digital rebalance controller circuit and digital demodulator comprise a distributed digital control circuit.

2. The circuit device of claim 1, wherein the digital drive controller circuit, the digital rebalance controller circuit and the digital demodulator are implemented on a single application specific integrated circuit (ASIC).

3. The circuit device of claim 1, wherein the drive mode response signal and the sense mode response signal are combined separately in the digital drive controller circuit and in the digital rebalance controller circuit to aid in isolating the drive and sense modes.

4. The circuit device of claim 3, wherein the drive mode response signal and the sense mode response signal are combined separately in the digital drive controller circuit and in the digital rebalance controller circuit each with a pair of programmable amplifiers.

5. The circuit device of claim 3, wherein the drive mode response signal and the sense mode response signal are combined separately in the digital drive controller circuit and in the digital rebalance controller circuit each with a pair of programmable filters.

6. The circuit device of claim 1, wherein the drive signal and the sense rebalance signal are combined separately to excite the drive mode and regulate the sense mode to aid in isolating the drive and sense mode.

7. The circuit device of claim 6, wherein the drive signal and the sense rebalance signal are combined with a separate pair of programmable amplifiers to each excite the drive mode and regulate the sense mode.

8. The circuit device of claim 6, wherein the drive signal and the sense rebalance signal are combined with a separate pair of programmable filters to each excite the drive mode and regulate the sense mode.

9. The circuit device of claim 1, wherein the digital drive controller circuit comprises an automatic gain control for exciting the drive mode to the substantially constant amplitude.

10. The circuit device of claim 1, wherein the digital drive controller circuit and the digital rebalance controller circuit are programmable to match the vibratory gyroscope.

11. The circuit device of claim 10, wherein the programmable digital drive controller circuit and the programmable digital rebalance controller circuit each comprise one or more programmable finite impulse response (FIR) filters programmed to match the vibratory gyroscope.

12. The circuit device of claim 10, wherein the programmable digital drive controller circuit and the programmable digital rebalance controller circuit comprise one or more programmable amplifiers.

13. The circuit device of claim 12, wherein the one or more programmable amplifiers comprise a pair of programmable amplifiers, each pair programmed to combine separately the drive mode response signal and the sense mode response signal in the digital drive controller circuit and in the digital rebalance controller circuit to aid in isolating the drive and sense modes.

14. The circuit device of claim 12, wherein the one or more programmable amplifiers comprise a pair of programmable amplifiers, each pair programmed to combine separately the drive signal and the sense rebalance signal to excite the drive mode and regulate the sense mode to aid in isolating the drive and sense modes.

15. The circuit device of claim 1, wherein the digital-drive controller circuit comprises an automatic gain control for exciting the drive mode to the substantially constant amplitude and the programmable digital drive controller circuit and the programmable digital rebalance controller circuit each comprise one or more programmable finite impulse response (FIR) filters programmed to match the vibratory gyroscope;
wherein the drive mode response signal and the sense mode response signal are combined separately in the digital drive controller circuit and in the digital rebalance controller circuit each with a pair of programmable amplifiers and the drive signal and the sense rebalance signal are combined with a separate pair of programmable amplifiers to each excite the drive mode and regulate the sense mode; and wherein the digital drive controller circuit, the digital rebalance controller circuit and the demodulator are implemented on a single application specific integrated circuit (ASIC).

16. A method of operating a vibratory gyroscope comprising the steps of:

producing a drive signal for exciting a drive mode of a vibratory gyroscope with a digital drive controller circuit to a substantially constant amplitude from a drive mode response signal;

producing a sense rebalance signal from a sense mode response signal with a digital rebalance controller circuit to regulate a sense mode of the vibratory gyroscope to substantially zero; and demodulating the sense rebalance signal with the drive mode response signal using a demodulator to produce a digital rate estimate of the vibratory gyroscope;

wherein the digital drive controller circuit, digital rebalance controller circuit and digital demodulator comprise a distributed digital control circuit.

17. The method of claim 16, wherein the digital drive controller circuit, the digital rebalance controller circuit and the demodulator are implemented on a single application specific integrated circuit (ASIC).

18. The method of claim 16, further comprising combining separately the drive mode response signal and the sense mode response signal in the digital drive controller circuit and in the digital rebalance controller circuit to aid in isolating the drive and sense modes.

19. The method of claim 18, further comprising combining separately the drive mode response signal and the sense mode response signal in the digital drive controller circuit and in the digital rebalance controller circuit each with a pair of programmable amplifiers.

20. The method of claim 18, further comprising combining separately the drive mode response signal and the sense mode response signal in the digital drive controller circuit and in the digital rebalance controller circuit each with a pair of programmable filters.

21. The method of claim 16, further comprising combining separately the drive signal and the sense rebalance signal to excite the drive mode and regulate the sense mode to aid in isolating the drive and sense mode.

22. The method of claim 21, further comprising combining separately the drive signal and the sense rebalance signal with a separate pair of programmable amplifiers to each excite the drive mode and regulate the sense mode.

23. The method of claim 21, further comprising combining separately the drive signal and the sense rebalance signal with a separate pair of programmable filters to each excite the drive mode and regulate the sense mode.

24. The method of claim 16, wherein the digital drive controller circuit comprises an automatic gain control for exciting the drive mode to the substantially constant amplitude.

25. The method of claim 16, wherein the digital drive controller circuit and the digital rebalance controller circuit are programmable to match the vibratory gyroscope.

26. The method of claim 25, wherein the programmable digital drive controller circuit and the programmable digital rebalance controller circuit each comprise one or more programmable finite impulse response (FIR) filters programmed to match the vibratory gyroscope.

27. The method of claim 25, wherein the programmable digital drive controller circuit and the programmable digital rebalance controller circuit comprise one or more programmable amplifiers.

28. The method of claim 27, wherein the one or more programmable amplifiers comprise a pair of programmable amplifiers, each pair programmed to combine separately the drive mode response signal and the sense mode response signal in the digital drive controller circuit and in the digital rebalance controller circuit to aid in isolating the drive and sense modes.

29. The method of claim 27, wherein the one or more programmable amplifiers comprise a pair of programmable amplifiers, each pair programmed to combine separately the drive signal and the sense rebalance signal to excite the drive mode and regulate the sense mode to aid in isolating the drive and sense modes.

30. The method of claim 16, wherein the drive loop comprises an automatic gain control for exciting the drive mode to the substantially constant amplitude and the programmable drive loop and the programmable rebalance loop each comprise one or more programmable finite impulse response (FIR) filters programmed to match the vibratory gyroscope;

wherein the drive mode response signal and the sense mode response signal are combined separately in the drive loop and in the rebalance loop each with a pair of programmable amplifiers and the drive signal and the sense rebalance signal are combined with a separate pair of programmable amplifiers to each excite the drive mode and regulate the sense mode; and wherein the drive loop, the rebalance loop and the demodulator are implemented on a single application specific integrated circuit (ASIC).

* * * * *